(12) United States Patent
Fitzgerald

(10) Patent No.: US 7,540,953 B2
(45) Date of Patent: Jun. 2, 2009

(54) INTEGRATED BELOW-GROUND VAULT WITH A FILTERED CATCH BASIN

(76) Inventor: James Fitzgerald, 28027 Oak Ranch Rd., Escondido, CA (US) 92026

( * ) Notice: Subject to any disclaimer, the term of this patent is extended or adjusted under 35 U.S.C. 154(b) by 0 days.

(21) Appl. No.: 11/623,023

(22) Filed: Jan. 12, 2007

(65) Prior Publication Data
US 2007/0262009 A1 Nov. 15, 2007

Related U.S. Application Data

(63) Continuation-in-part of application No. 11/046,490, filed on Jan. 28, 2005, now Pat. No. 7,163,635.

(51) Int. Cl.
*E03F 5/14* (2006.01)
(52) U.S. Cl. .......... 210/162; 210/163; 210/165; 210/170.03; 210/445; 210/452; 210/474; 210/477; 404/4; 405/36; 405/46
(58) Field of Classification Search .......... 210/162, 210/163, 164, 165, 170.03, 445, 448, 452, 210/473, 474, 477; 404/4, 5; 405/36, 45, 405/46
See application file for complete search history.

(56) References Cited

U.S. PATENT DOCUMENTS

| | | | | |
|---|---|---|---|---|
| 1,675,714 A | * | 7/1928 | Koch | 210/163 |
| 2,711,223 A | * | 6/1955 | Temple | 210/170.03 |
| 3,066,802 A | * | 12/1962 | Loffler | 210/163 |
| 3,501,007 A | * | 3/1970 | Davis | 405/36 |
| 4,720,209 A | * | 1/1988 | Iams | 405/36 |
| 5,232,587 A | * | 8/1993 | Hegemier et al. | 210/162 |
| 5,372,714 A | | 12/1994 | Logue, Jr. | |
| 5,575,925 A | | 11/1996 | Logue, Jr. | |
| 5,725,760 A | | 3/1998 | Monteith | |
| 5,727,901 A | * | 3/1998 | Rennie et al. | 405/45 |
| 5,753,115 A | * | 5/1998 | Monteith | 210/170.03 |
| 5,849,181 A | | 12/1998 | Monteith | |
| 6,200,484 B1 | * | 3/2001 | McInnis | 210/170.03 |
| 6,547,962 B2 | * | 4/2003 | Kistner et al. | 210/170.03 |
| 6,602,408 B1 | * | 8/2003 | Berkey | 210/477 |
| 6,676,832 B2 | | 1/2004 | de Bruijn et al. | |
| 2005/0082212 A1 | * | 4/2005 | Wade | 210/170 |

* cited by examiner

*Primary Examiner*—Christopher Upton
(74) *Attorney, Agent, or Firm*—Charles F. Reidelbach, Jr., Esq.

(57) ABSTRACT

The invention relates to an integrated belowground vault with filter catch basin, that allows the runoff water to enter into a belowground two-part vault passing through a commercially available replaceable filter before being transferred out to the sewer, Rood control system or out through a French drain consisting of a cavity below the device that is filled with drain gravel. A layer of filter cloth can optionally be placed over the drain gravel. This device will be manufactured in variety of sizes and shapes and made from several different materials. The device has the unique ability of being capable of filtering low flow water runoff while allowing high volume to pass through with the added benefit of not retaining water that can become a mosquito breeding ground.

7 Claims, 4 Drawing Sheets

INTEGRATED BELOW-GROUND VAULT WITH A FILTERED CATCH BASIN

The present invention is a continuation-in-part of U.S. patent application Ser. No. 11/046,490, filed on Jan. 28, 2005, now U.S. Pat. No. 7,163,635 and herein incorporated by reference in its entirety.

FIELD OF THE INVENTION

The present invention relates to an improvement in the field of handling, purification and dispersement of residual and commercial run-off water and more particularly, but not by way of limitation, to a novel method of the removal of waterborne pollutants such as vegetation, litter, coarse sediments, petroleum hydrocarbons and other pollutants and contaminants from residential and commercial run-off water. More specifically, this invention supplies a belowground vault composed of several parts and in a variety of sizes and shapes with a replaceable basin insert filter for this purpose.

BACKGROUND OF THE INVENTION

The inventor, while working in the plumbing field has found the need for the purification of run-off water from residential and commercial properties. With the increased concerns of environmental controls placed on the run-off waters that are contaminating our streams, flood control channels, and estuaries eventually running into the oceans, there is a need for purification. Air borne contaminants landing on rooftops along with oils on driveways and parking lots comprise a major portion of these contaminants and need to be filtered before running off. It is easy to say that the public utilities should solve the problem, but a more logical solution is to solve it on a smaller scale at individual residential and commercial sites. Some up-scale housing developments are taking the lead and requiring that the run-off water from the roof pass through a filter system before being transferred into the flood control or sewer system. This is where the inventor initially worked out the unique integrated belowground vault with filter catch basin. This system allows the run-off water to enter into a belowground vault and pass through a commercially available replaceable filter before being transferred out to the flood control system or out through a French drain consisting of a cavity filled with drain gravel and positioned below the integrated belowground vault with filter catch basin. A layer of filter cloth can optionally be placed over the drain gravel. The depth of the French drain cavity is generally determined by the absorption rate of the subsoil, and in some cases may be the only way of removing the run-off water. The majority of the time run-off water comes in small amounts and can easily be filtered. However, in the event of heavy rainfall, a specially designed filter having an overflow opening may be used to divert excess water into the flood control system.

REFERENCES CITED

U.S. Pat. No. 6,676,832 B2 of Hans de Bruijn et al. describes an apparatus that is a surface water purifying catch basin which uses a lamella separator to separate out fine sediment and a separate chamber to trap heavy debris, oil, and floating debris. The surface water enters an inlet chamber that is separated from a settling chamber by a divider wall that has a lower opening between the chambers and a higher overflow. The inlet chamber will trap floating contaminates and those that are heavier than the water. The opening between the chambers permits the surface water to flow into and through the lamella separator. The catch basin exit is from the settling chamber, but the water can reach the exit only through the lamella separator that separates out the fine sediment in the water. All of the accumulated contaminates can be removed through access holes in the top of the catch basin.

Although this patent teaches an inlet and outlet on either side of the filtering mechanism, it can be distinguished from this invention in that it allows some water to exit directly through the outlet without passing through the filtering mechanism and the inlet is located at or near ground level. Additionally, the device without a bottom drain will retain a certain amount of water all of the time, which will be a natural breeding ground for mosquitoes.

U.S. Pat. No. 5,849,181 of Joseph Gordon Monteith teaches of an improved catch basin that is constituted by a cylindrical container with a partition dividing the internal volume into a lower compartment and an upper compartment. The partition includes an intake region and an outlet region, each communicating with a vertical pipe extending downwardly from the partition and opening into the lower treatment chamber at an intermediate location therein, the intake region and the outlet region being diametrically opposite one another. The partition defines a central, oblique ramp that urges entering liquid in the direction of the intake opening of the intake region, thus under conditions of low liquid flow into the catch basin, all entering liquid will be directed to the intake region, descending along the intake conduit and into the lower compartment, conversely, under conditions of high liquid flow into the catch basin, a portion of the liquid will overrun the ramp and gain direct access to the outlet region, from which it will exit the catch basin.

This catch basin can be distinguished from this invention in that the lower portion of the basin is not a one-piece unit. The inlet and outlet are located at the same level in the upper portion of the basin, requiring the water to pass from the upper portion, to the lower portion through the filtering mechanism, and then to return up to the upper portion to exit the basin. And again the device without a bottom drain will retain a certain amount of water all of the time, which will be a natural breeding ground for mosquitoes.

U.S. Pat. No. 5,725,760 of Joseph Gordon Monteith relates to a tank interceptor for rainwater and wastewater that includes a container divided by a partition into an upper by-pass compartment and a lower treatment compartment, an inlet and outlet for the container are located in the side wall adjacently above the partition. The partition defines a raised weir that constrains liquids entering at low flow rates to pass downwardly through an adjacent opening through the partition to collect in the treatment compartment below the partition. A second opening through the partition is located adjacent the outlet, and pipes are associated with both openings. One of the openings is made large enough to allow passage of maintenance personnel, thus obviating the need for a further access opening and a liquid-tight seal for that further opening. An access opening at the top of the container is generally aligned with the large-diameter opening through the partition, thus allowing inspection, sampling and pumping out, without requiring maintenance personnel to enter the container.

This patent relates to a large tank interceptor to be used along rainwater and waste water lines to separate out solids and contaminants. This unit is large enough for a man to go down into having a ladder to reach the bottom. It would be difficult to have this in a reduced size to filter rainwater coming off the roof of private residences at the locations of the downspouts. This tank additionally will retain water in the bottom.

U.S. Pat. No. 5,575,925 of George E. Logue, Jr. discloses a removable filter for buried catch basins. The filter includes a bag located below grade level in the catch basin and looped flaps that extend above grade level and aid in removal of the filter from the catch basin. The filter is held in place in the basin by a heavy grate that rests on the flaps. The flaps extend at grade level away from the grate. The filter is removed from the catch basin for dumping by inserting a lift rod in each flap loop and hooking lift chains to the rods at the openings in the loops, This patent discloses a removable filter bag for catch basins that is held in place by the weight of the metal grating located at the surface. It does not have a high volume overflow and does not indicate the unique features of the structure disclosed within this patent.

None of these previous efforts, however, provides the benefits attendant with the present invention. The present invention achieves its intended purposes, objects and advantages over the prior art devices through a new, useful and unobvious combination of method steps and component elements, with the use of a minimum number of functioning parts, at a reasonable cost to manufacture and by employing readily available materials. Some of the shortcomings of the prior art are that they are not integrated units, are very large units not being practical for residential use, they require being pumped out or climbed into for cleaning, and they retain water at the bottom becoming a breeding ground for mosquitoes.

OBJECTS OF THE INVENTION

It is a primary object of this invention to improve the handling, purification and dispersement of residential and commercial run-off water, It is a further object of this invention to create a device that may be constructed from a variety of different materials.

It is another object of this invention to create a device that can be made small to be placed at the downspouts of residential structures, larger to handle a complete residential or commercial sites or even larger to handle parking lots and the like.

Another object of this invention is to create a means to handle run-off water through a filter without retaining residual water that has the possibility of becoming a mosquito breeding ground.

A still further object of this invention is to create a device that will use a commercially available replaceable filter unit having a high volume overflow.

Yet, another object of this invention is to create a device with a bottom drain, or have the option of using a French drain system to insure that no water remains in the bottom of the device.

Another object of this invention is to create a device that will be easily installed as an integrated unit.

A final object of this invention is to create a device that will solve some of the increasing environmental problems involved with run-off water from residential and commercial sites.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

In this respect, before explaining at least one embodiment of the invention in detail, it is to be understood that the invention is not limited in its application to the details of construction and to the arrangement, of the components set forth in the following description or illustrated in the drawings. The invention is capable of other embodiments and of being practiced and carried out in various ways. In addition, it is to be understood that the phraseology and terminology employed herein are for the purpose of description and should not be regarded as limiting.

SUMMARY OF THE INVENTION

Briefly stated, the present invention contemplates in the preferred embodiment a novel water-purifying vault that is an integrated two-compartment precast concrete container, through which water flows. It must be understood at this time that a variety of products can be used in the fabrication of the device including concrete cinder blocks or a wide variety of plastics. This vault is primarily intended for the filtering of residential or commercial run-off water and the channeling of such water into the sewer or flood control systems, though other applications are anticipated. Currently, the application of this device is achieved using a filtration system built through a multi-step process. The process involves digging out a cylindrical hole in the ground into which the concrete vaults and other parts are lowered. A cover plate spacer ring and solid cover plate will be installed over the vault cover orifice. Outlet piping leads from the device outlet orifice to the sewer or flood control system. Inlet piping may be installed through the inlet orifice connecting to a number of different run-off water sources. Optionally, the inlet orifice may be blocked and a grated cover plate can be installed over the cover plate spacer ring for direct water flow into the top of the device. When the entire system is installed, the concrete lid and grate are preferably at ground level.

The structure of the device consists of a lower vault section that is preferably cylindrical in shape, with a solid concrete base, though other shapes or configurations may be used. As shown, the center of the tower vault has a cuboid interior cavity that is offset from the diametric center of the cylinder, though alternate shapes are anticipated and the space may be located other than offset from the center of the compartment depending upon the size and shape of the device. At the bottom of the interior space, there is a cylindrical outlet orifice in the wall of the lower vault section. This orifice allows the lower vault section to be connected to a pipe system for the filtered water to exit.

The top surface of the lower vault section has an interlocking female groove around the outside edge with the central area sloping towards the center of the cuboid interior cavity. A recess at the top of the cuboid interior cavity permits the insertion of the removable filter unit held in place by a galvanized or cast iron grate that will screen out large debris. The filter inserts are constructed of geotextile monofilament and filled with fossil rock petroleum absorbent. The lower portion of the inlet orifice is formed into the edge of the lower vault section keying the lower vault section to the upper vault section.

The lower edge of the upper vaulted section has an interlocking male tongue around the outside edge to match the interlocking female groove on the lower vault section forming a conventional tongue and groove interlocking joint, although any form of interlocking mechanism may be used to accomplish the intent of the invention. The inlet orifice in the upper vault section is "U" shaped to slip over inlet piping during the installation of the device. The upper vault section is cylindrically shaped with an interlocking female groove on the top surface. A matching interlocking male tongue is in the lower surface of the vault cover. The vault cover has an orifice that is shown offset, although it may be centrally located depending on the size and shape of the device. A cover plate spacer ring and cover plate, either solid or grated, enclose the central chambers of the device.

An alternate embodiment of the integrated belowground vault with filter catch basin will have no bottom in the lower vault section that is cylindrically shaped. A filter support segment will be locked between the lower vault section and the upper vault section by the means of the interlocking female grooves and male tongues. It should be noted that the filter support segment can be made of pre-cast concrete as shown or could also be made from plastic or metal and still fall within the scope of this patent. The top surface of the filter support segment will slope to the recess holding the removable filter unit and the galvanized or cast iron grate. Below the lower vault segment a hole will be dug and filled with drain gravel, commonly called a French drain. Replaceable filter cloth can be placed over the drain gravel to prevent sediment from clogging the drain gravel.

By having the drain outlet at the bottom of the lower vault section or by using the French drain below the devices it insures that water is not trapped in the bottom to become a mosquito breeding ground. Further, in either case, a sump pump can be positioned in the lower vault section and connected to the outlet orifice for removing water in periods of excessive water run-off or when the ground has become saturated.

With respect to the above description then, it is to be realized that the optimum dimensional relationships for the parts of the invention, to include variations in sizes materials, shape, form, function and manner of operation, assembly and use, are deemed readily apparent and obvious to one skilled in the at, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

BRIEF DESCRIPTION OF THE DRAWINGS

The accompanying drawings incorporated in and forming a part of this specification, illustrate embodiments of the invention and together with the detailed description explain the principles of this invention.

DETAILED DESCRIPTION OF THE PREFERRED EMBODIMENTS

Figure 1:
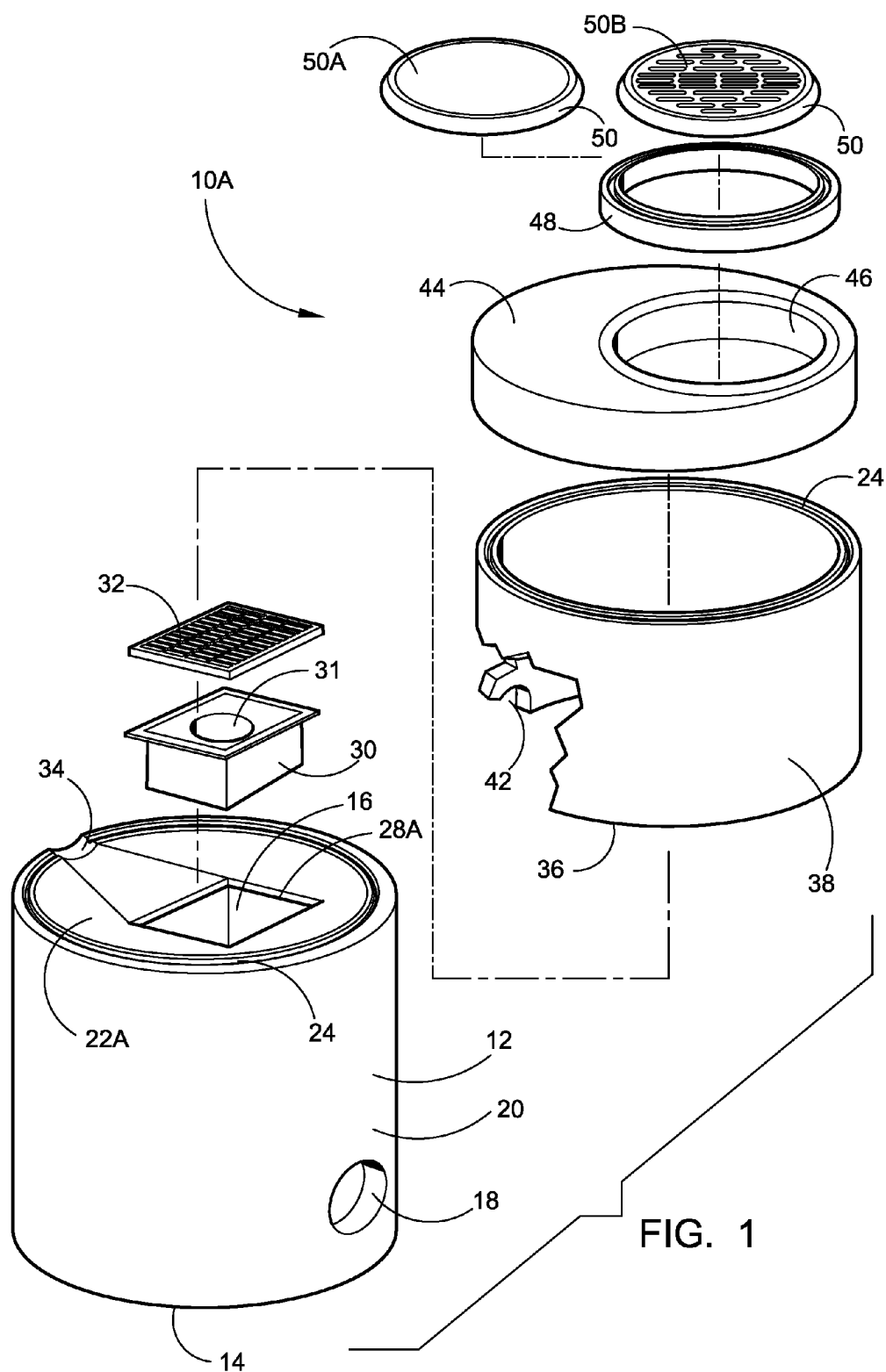
FIG. 1 depicts a perspective exploded view of the integrated belowground vault with filter catch basin.
Figure 2:
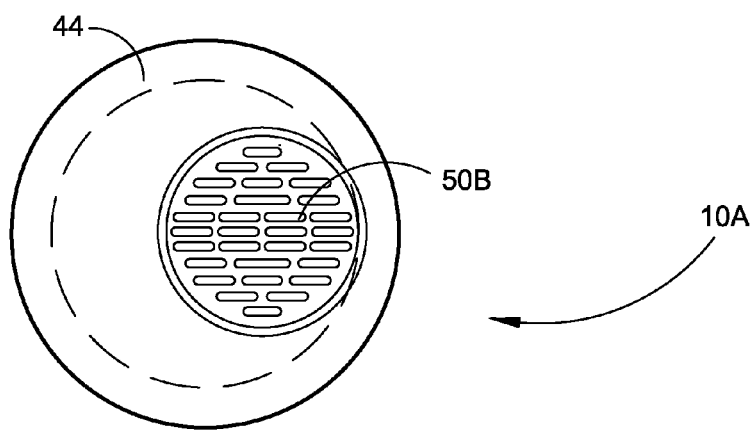
FIG. 2 is a top plan view of the integrated belowground vault with filter catch basin using the grated cover plate.
Figures 3, 4:
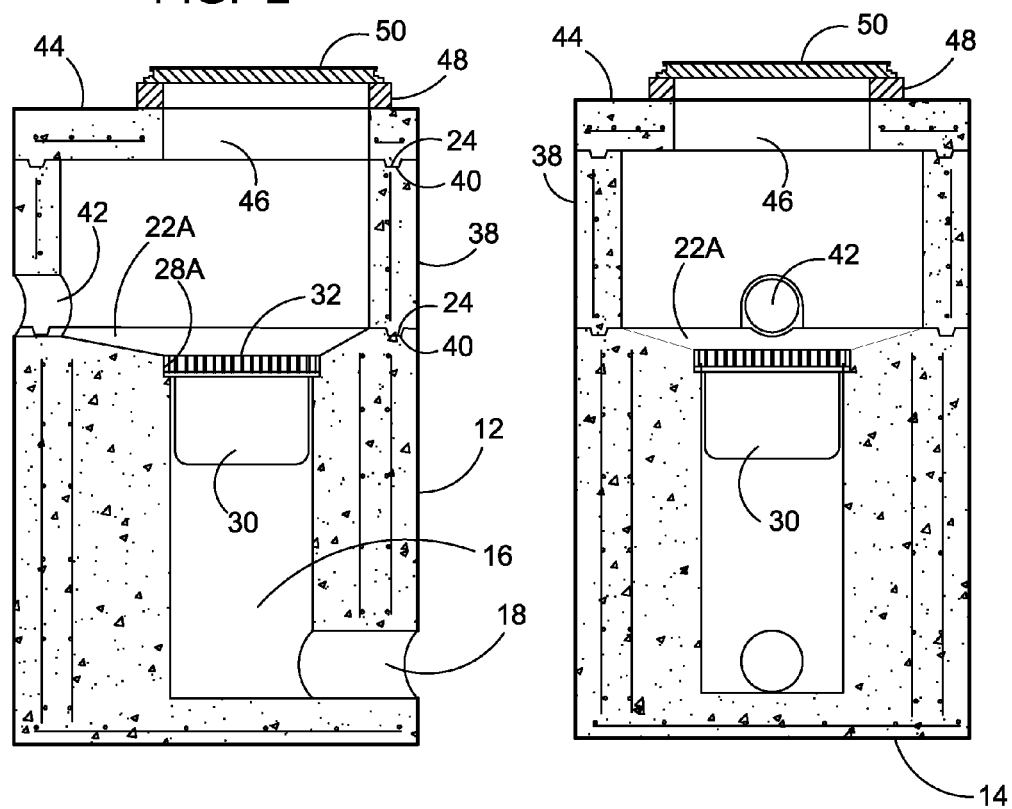
FIG. 3 is a section view through the integrated belowground vault with filter catch basin through the inlet and outlet orifices.
FIG. 4 is a section through the integrated belowground vault with filter catch basin perpendicular to the inlet and outlet orifices.

Referring now to the drawings, wherein similar parts of the invention are identified by like reference numerals, there is seen in FIG. 1 a perspective exploded view of the integrated belowground vault with filter catch basin 10A. The device consists of a one piece lower vault section or housing 12A that is preferably cylindrical in shape with a solid concrete bottom 14, although other shapes and configurations may be used. As shown, the center of the lower vault has a cuboid interior cavity 16 that is offset from the diametric center of the cylinder. At the bottom of the interior space, there is a cylindrical outlet orifice 18 in the wall 20 of the lower vault section 12A. The top surface 22A of the lower vault section 12A has an interlocking female groove 24 around the outside edge with the central area sloping towards the center of the cuboid interior cavity 16. A recess 28A at the top of the cuboid interior cavity 16 permits the insertion of the removable filter unit 30 held in place by a galvanized cast iron grate 32. In the center of the removable filter unit 30 is a high volume overflow or bypass orifice 31. The lower portion 34 of the inlet orifice 42 is formed into the edge of the lower vault section 12A keying the lower vault section 12A to the upper vault section 38. The lower edge 36 of the upper vaulted section 38 has an interlocking male tongue 40 around the outside edge to match the interlocking female groove 24 on the lower vault section 12A, further clarified in FIGS. 3 and 4. The inlet orifice 42 in the upper vault section 38 is "U" shaped to slip over inlet piping during the installation of the device. The upper vault section 38 is a one piece housing cylindrically shaped with an interlocking female groove 24 on the top surface. A matching interlocking male tongue 40 is in the lower surface of the vault cover 44. The vault cover 44 has an orifice 46 that is shown offset, although it may be centrally located depending on the size and shape of the device. A cover plate spacer ring 48 and cover plate 50, either solid 50A or grated 50B enclose the central chambers of the device.

Figure 5:
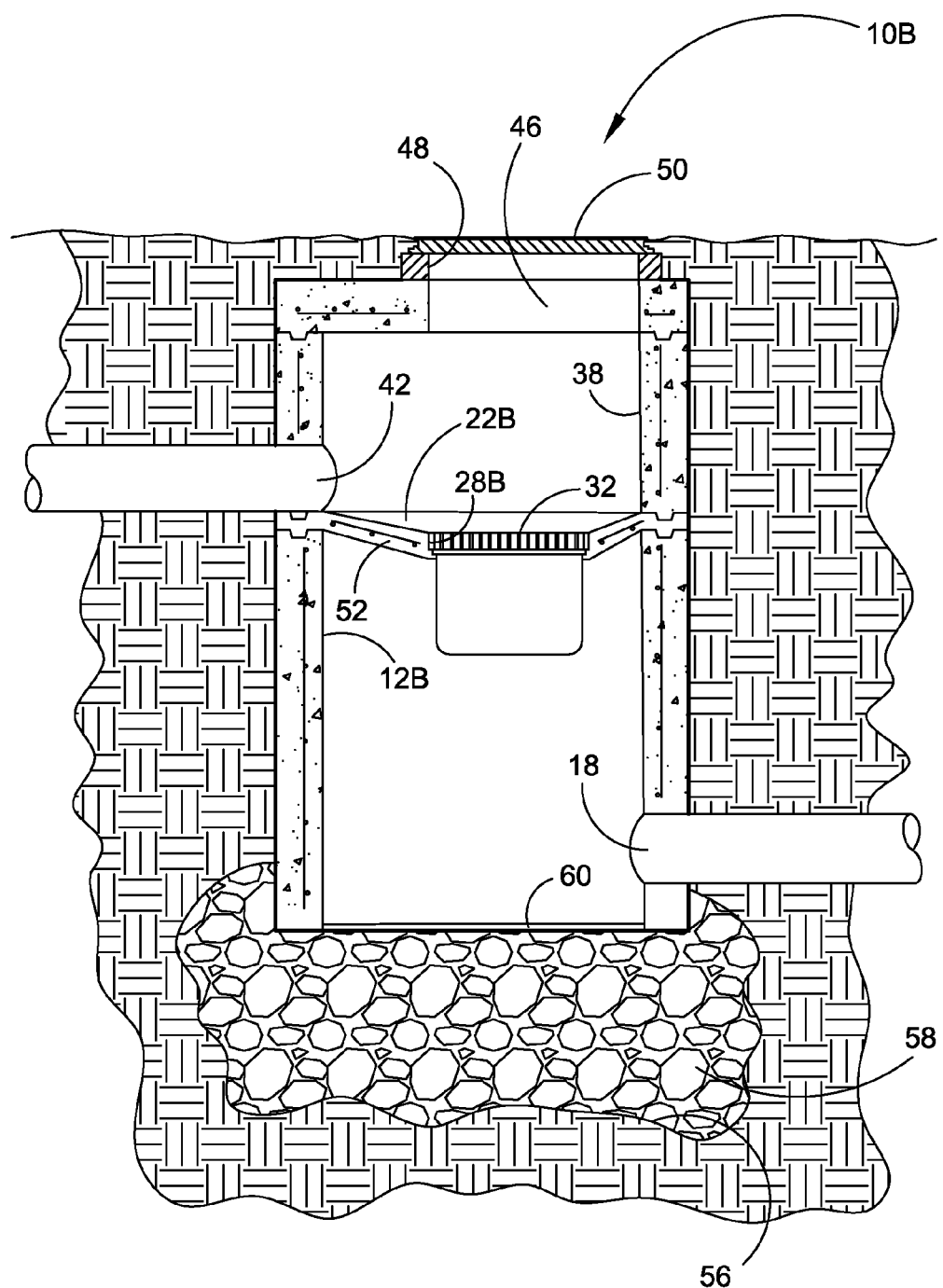
FIG. 5 is a section through the alternate embodiment of the integrated belowground vault with filter catch basin illustrating the lower vault unit with the open bottom, the optional filter cloth and the hole filled with drain gravel.
Figure 6:
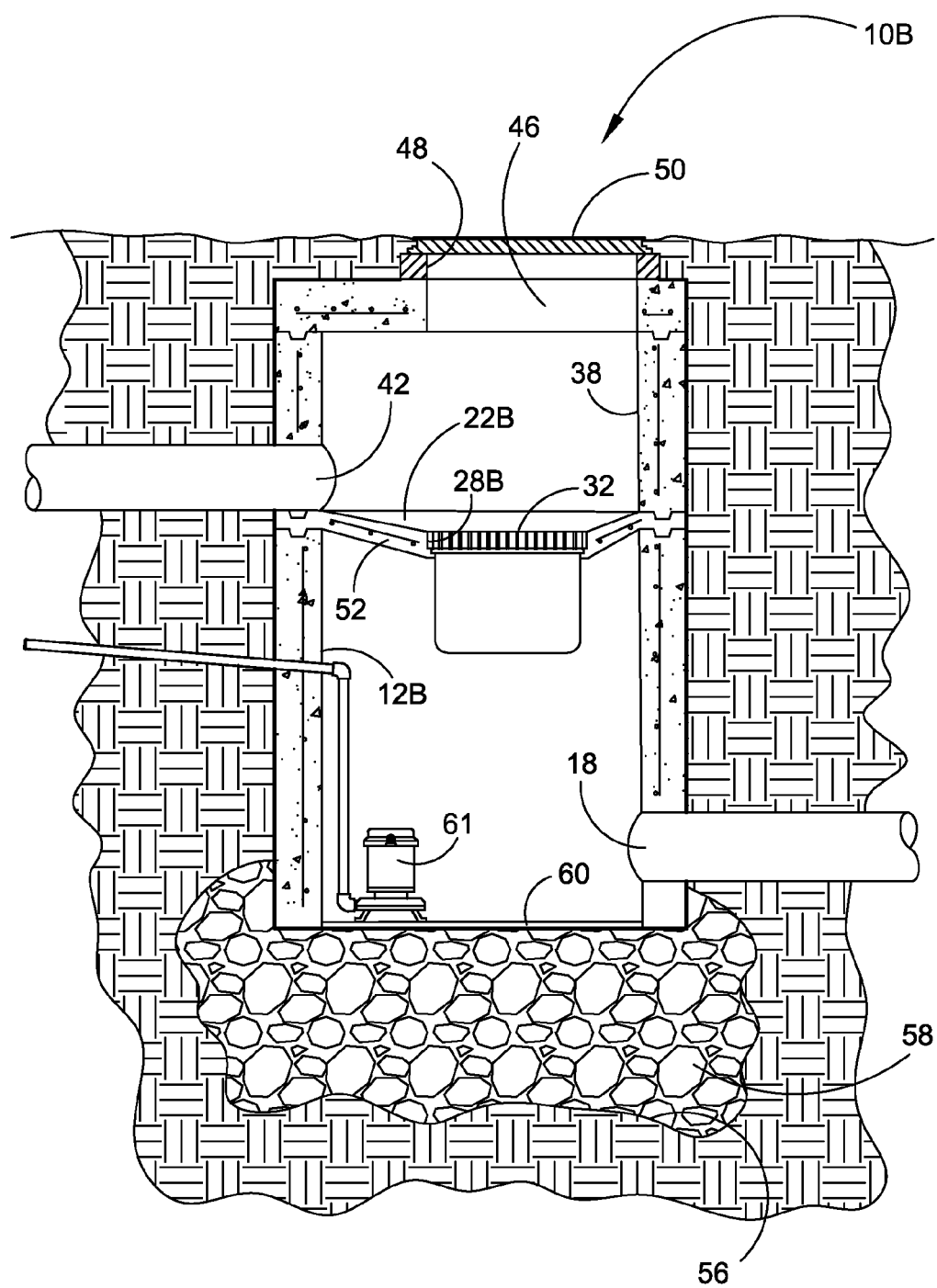
FIG 6. is a section through the alternate embodiment of the integrated belowground vault with filter catch basin illustrating the lower vault unit with the open bottom, and the sump pump for pumping water through the outlet.

An alternate embodiment of the integrated belowground vault with filter catch basin 10B illustrated in FIG. 5 will have no bottom 14 in the lower vault section 12B that is cylindrically shaped. A filter support segment 52 with the sloping top surface 22B will be locked between the lower vault section 12B and the upper vault section 38 by the means of the interlocking female grooves 24 and interlocking male tongues 40. It should be noted that the filter support segment 52 can be made of pre-cast concrete as shown or could also be made from metal or plastic and still fall within the scope of this patent. The lop surface of the filter support segment 22B will slope to the recess 28B holding the removable filter unit 30 and the galvanized cast iron grate 32. Below the lower vault segment 12B a hole 56 will be dug and filled with drain gravel 58, commonly called a French drain. Replaceable filter cloth 60 can be placed over the drain gravel 58 to keep sediment from clogging the drain gravel 58.

Additionally, or alternatively, a sump pump 61 may be placed in or secured to the interior cavity 16 or lower vault section 12A or 12B. This is especially useful in situations where an outlet orifice 18 is not readily available, or during times of heavy or excessive rainfall. The sump pump is used to pump water from the bottom of the cavity to a curb or other location.

The integrated belowground vault with filter catch basin 10A and 10B shown in the drawings and described in detail herein disclose arrangements of elements of particular construction and configuration for illustrating preferred embodiments of structure and method of operation of the present invention. It is to be understood, however, that elements of different construction and configuration and other arrangements thereof, other than those illustrated and described may be employed for providing an integrated belowground vault with filter catch basin 10A and 10B in accordance with the spirit of this invention, and such changes alternations and modifications as would occur to those skilled in the art, are considered to be within the scope of this invention as broadly defined in the appended claims.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

I claim:

1. An integrated below ground vault for removing waterborne pollutants from surface run-off water on a property, comprising:
   a vault having a lower and upper section, the sections mated by way of an interlocking joint;
   wherein the upper section has an inlet orifice formed therein for receiving a water transporting inlet pipe;
   a unitary filter support segment positioned between and mated with the lower and upper sections by means of an interlocking joint;
   the lower section having an outlet for allowing water to exit the vault; and
   wherein the filter support segment has a recess for receiving a removable filter unit, and wherein the top surface of the filter support segment is sloped toward the recess for ease in transporting run-off water from the inlet pipe to the filter unit.

2. A vault as recited in claim 1, wherein said lower section has an open ended bottom for allowing water to exit the vault.

3. A vault as recited in claim 1, wherein said lower section has an outlet orifice formed in a wall for allowing water to exit the vault.

4. A vault as recited in claim 3, further comprising a sump pump positioned in said lower section for pumping water through said outlet.

5. A vault as recited 1, wherein said lower section has an outlet orifice formed in the bottom for allowing water to exit the vault.

6. An integrated below ground vault for removing waterborne pollutants from surface run-off water on a property, comprising:
   a vault having a lower and upper section, the sections mated by way of an interlocking joint;
   wherein the upper section has an inlet orifice formed therein for receiving a water transporting inlet pipe;
   a unitary filter support segment positioned between and mated with the lower and upper sections by means of an interlocking joint;
   the lower section having an open bottom and an outlet orifice formed in a wall of the lower section for allowing water to exit the vault; and
   wherein the filter support segment has a recess for receiving a removable filter unit, and wherein the top surface of the filter support is sloped toward the recess for ease in transporting run-off water from the inlet pipe to the filter unit.

7. A vault as recited in claim 6, further comprising a sump pump positioned in said lower section for pumping water through the outlet orifice.

\* \* \* \* \*